US012770651B2

(12) United States Patent
Senda et al.

(10) Patent No.: US 12,770,651 B2
(45) Date of Patent: Oct. 20, 2026

(54) MANUFACTURING METHOD OF A DISK DRIVE SUSPENSION

(71) Applicant: NHK SPRING CO., LTD., Yokohama (JP)

(72) Inventors: Takahiro Senda, Yokohama (JP); Osamu Iriuchijima, Yokohama (JP); Junji Sumiyoshi, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 894 days.

(21) Appl. No.: 17/965,871

(22) Filed: Oct. 14, 2022

(65) Prior Publication Data

US 2023/0123177 A1 Apr. 20, 2023

(30) Foreign Application Priority Data

Oct. 20, 2021 (JP) ................................ 2021-171800

(51) Int. Cl.

| | |
|---|---|
| ***G11B 5/127*** | (2006.01) |
| ***B23K 26/50*** | (2014.01) |
| ***G11B 5/48*** | (2006.01) |
| ***H04R 31/00*** | (2006.01) |

(52) U.S. Cl.

CPC ............ *G11B 5/4833* (2013.01); *B23K 26/50* (2015.10); *G11B 5/4826* (2013.01)

(58) Field of Classification Search

None

See application file for complete search history.

(56) References Cited

U.S. PATENT DOCUMENTS

| | | | | |
|---|---|---|---|---|
| 6,711,929 B2 | 3/2004 | Yamaguchi et al. | | |
| 7,206,171 B2 | 4/2007 | Okawara | | |
| 8,804,135 B2 * | 8/2014 | Mashima | ................ | G11B 5/48 356/337 |
| 9,117,466 B2 | 8/2015 | Takikawa et al. | | |
| 2006/0053621 A1 | 3/2006 | Ichimura et al. | | |
| 2007/0064333 A1 | 3/2007 | Shindo et al. | | |

(Continued)

FOREIGN PATENT DOCUMENTS

| | | |
|---|---|---|
| CN | 1373470 A | 10/2002 |
| CN | 1925005 A | 3/2007 |
| CN | 104424962 A | 3/2015 |

(Continued)

OTHER PUBLICATIONS

Chinese Office Action (and an English language translation thereof) dated Feb. 15, 2025, issued in counterpart Chinese Application No. 202211243014.7.

*Primary Examiner* — Paul D Kim

(74) *Attorney, Agent, or Firm* — Holtz, Holtz & Volek PC

(57) ABSTRACT

According to an embodiment, a manufacturing method of a disk drive suspension comprises determining a first position on the outrigger at which a bent portion is to be formed by irradiating a first laser beam, calculating predicted values of pitch and roll angles of a tongue in a case where the bent portion is formed at the first position, determining a second position on the outrigger to which a second laser beam is to be irradiated to make the predicted values approximate to predetermined target values, and irradiating the first laser beam to the first position to form the bent portion, and the second laser beam to the second position.

7 Claims, 13 Drawing Sheets

(56) References Cited

U.S. PATENT DOCUMENTS

| | | | | |
|---|---|---|---|---|
| 2010/0079915 | A1 | 4/2010 | Kido | |
| 2023/0117866 | A1* | 4/2023 | Nishida ................ | G11B 5/4826<br>29/603.03 |

FOREIGN PATENT DOCUMENTS

| | | | |
|---|---|---|---|
| JP | 2007066427 | A | 3/2007 |
| JP | 2010086630 | A | 4/2010 |

* cited by examiner

| | Before correction | | After correction | |
|---|---|---|---|---|
| | θp | θr | θp | θr |
| N | 110 | 110 | 110 | 110 |
| Ave. | 1.948 | -0.109 | 2.376 | -0.008 |
| Stdev. | 0.143 | 0.119 | 0.058 | 0.038 |
| Cpk | 0.066 | 0.673 | 2.558 | 3.008 |

| | Before correction | | After correction | |
|---|---|---|---|---|
| | θp | θr | θp | θr |
| N | 112 | 112 | 98 | 98 |
| Ave. | 2.208 | -0.100 | 2.411 | -0.006 |
| Stdev. | 0.262 | 0.215 | 0.077 | 0.038 |
| Cpk | 0.37 | 0.39 | 1.77 | 3.01 |

MANUFACTURING METHOD OF A DISK DRIVE SUSPENSION

CROSS-REFERENCE TO RELATED APPLICATIONS

This application is based upon and claims the benefit of priority from prior Japanese Patent Application No. 2021-171800, filed Oct. 20, 2021, the entire contents of which are incorporated herein by reference.

BACKGROUND OF THE INVENTION

1. Field of the Invention

The present invention relates to a manufacturing method and a manufacturing device of a disk drive suspension used in a hard disk drive, etc.

2. Description of the Related Art

Hard disk drives (HDDs) are used in information processing apparatuses such as personal computers. A hard disk drive comprises a magnetic disk which rotates around a spindle, a carriage which turns on a pivot, etc. The carriage comprises an actuator arm and is turned on the pivot in a track-width direction of the disk by a positioning motor such as a voice coil motor.

A disk drive suspension (hereinafter, simply referred to as a suspension) is mounted on the actuator arm. The suspension includes a load beam, a flexure overlaid on the load beam, etc. A slider constituting a magnetic head is provided in a gimbal portion formed in the vicinity of the distal end of the flexure. The slider is provided with elements (transducers) for accessing data, for example, reading or writing data. The load beam, the flexure, the slider, etc., constitute a head gimbal assembly.

The gimbal portion includes a tongue on which the slider is mounted, and a pair of outriggers formed on both sides of the tongue. The outriggers have shapes projecting outside both sides of the flexure, respectively. The vicinities of both end portions the length direction of each of the outriggers are fixed to the load beam by, for example, laser welding. Each of the outriggers can bend like a spring in their thickness direction and has an important role in securing the gimbal movement of the tongue.

To allow for an increase in the recording density of the disk, the head gimbal assembly needs to be made more smaller and be positioned on a recording surface of the disk more precisely. For that purpose, it is necessary to reduce the vibrations of the flexure as much as possible while securing the gimbal movement required of the head gimbal assembly. For example, as disclosed in JP 2010-86630 A, providing a damper member at part of a flexure to suppress the vibrations of a flexure also has been known.

When the disk rotates, the slider floats above the disk at a predetermined distance. To stabilize the posture of the slider when it is floating, the pitch and roll angles of the tongue and the slider must be highly precise. In this connection, for example, JP 2007-66427 A discloses the technique of correcting a pitch angle and a roll angle to appropriate values by irradiating a laser beam to a flexure.

If a damper member is attached to the flexure, the vibrations of the flexure can be suppressed, whereas the stiffness of the flexure changes. This change can have an unfavorable influence on the gimbal movement.

In addition, if a measure to suppress the vibrations of the flexure, such as the attachment of the damper member, or a step of correcting the pitch angle and the roll angle are carried out, the number of steps required to manufacture the suspension increases. As a result, the manufacturing cost of the suspension can increase.

BRIEF SUMMARY OF THE INVENTION

One of the objects of the present invention is to provide a manufacturing method and a manufacturing device which can suppress the vibrations of a flexure effectively and enable the efficient manufacture of a suspension.

According to an embodiment, a manufacturing method of a disk drive suspension comprises determining a first position on the outrigger of a flexure of the suspension, at which a bent portion is to be formed by irradiating a first laser beam, the bent portion being bent in a thickness direction; calculating predicted values of a pitch angle and a roll angle of a tongue of the flexure in a case where the bent portion is formed at the first, position on the outrigger; determining a second position on the outrigger to which a second laser beam is to be irradiated to make the predicted values approximate to predetermined target values; and irradiating the first laser beam to the first position to form the bent portion, and irradiating the second laser beam to the second position.

The manufacturing method may further comprise measuring initial values of the pitch angle and the roll angle in the suspension before the first laser beam and the second laser beam are irradiated; and calculating the predicted values, based on the initial values and predicted amounts of change of the pitch angle and the roll angle before and after the bent portion is formed at the first position.

The manufacturing method may further comprise determining the predicted amounts of change by measuring the pitch angle and the roll angle before and after the bent portion is formed in samples of the suspension.

The manufacturing method may further comprise determining the second position for making the predicted values approximate to the target values, using correction data which defines a relationship between the pitch angle and the roll angle deviating from the target values and the second position for making the pitch angle and the roll angle approximate to the target values.

The manufacturing method may further comprise measuring a first gain of the flexure in a case where the bent portion is not formed on the outrigger in a specific vibration mode; measuring a second gain of the flexure in a case where the bent portion is formed on the outrigger in the specific vibration mode the second gain being measured for each of positions on the outrigger at which the bent portion is formed; and determining a position with which the second gain smaller than the first gain is obtained, of the positions, as the first position.

The first position may be selected from a first region of the outrigger, and the second position may be selected from a second region of the outrigger different from the first region.

The load beam and the flexure of the suspension may be fixed by a first fixing portion and a second fixing portion closer to a distal end of the load beam than the first fixing portion. Moreover, the first region may be located between the dimple of the load beam and the first fixing portion in a length direction of the load beam.

According to another aspect of the embodiment, a manufacturing device of a disk drive suspension comprises a laser irradiation device configured to irradiate a first laser beam and a second laser beam to an outrigger of a flexure of the suspension; and a controller configured to control the laser irradiation device. The controller is configured to execute a process of calculating predicted values of a pitch angle and a roll angle of a tongue in a case where a bent portion is formed at a first position on the outrigger, the bent portion being bent in a thickness direction; and a process of determining a second position on the outrigger to which the second laser beam is irradiated to make the predicted values approximate to predetermined target values. The laser irradiation device is configured to irradiate the first laser beam to the first position to form the bent portion and to irradiate the second laser beam to the second position.

The manufacturing device may further comprise an angle measuring device configured so measure initial values of the pitch angle and the roll angle in the suspension before the first laser beam and the second laser beam are irradiated. In this case, the controller may be configured to calculate the predicted values, based on the initial value and predicted amounts of change of the pitch angle and the roll angle before and after the bent portion is formed at the first position.

The controller may be configured to determine the second position for making the predicted values approximate to the target values, using correction data which defines a relationship between the pitch angle and the roll angle deviating from the target values and the second position for making the pitch angle and the roll angle approximate to the target values.

The present invention can provide a manufacturing method and a manufacturing device which can suppress the vibrations of a flexure effectively and enable the efficient manufacture of a suspension.

Additional objects and advantages of the invention will be set forth in the description which follows, and in part will be obvious from the description, or may be learned by practice of the invention. The objects and advantages of the invention may be realized and obtained by means of the instrumental ties and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described with reference to the drawings.

Figure 1:
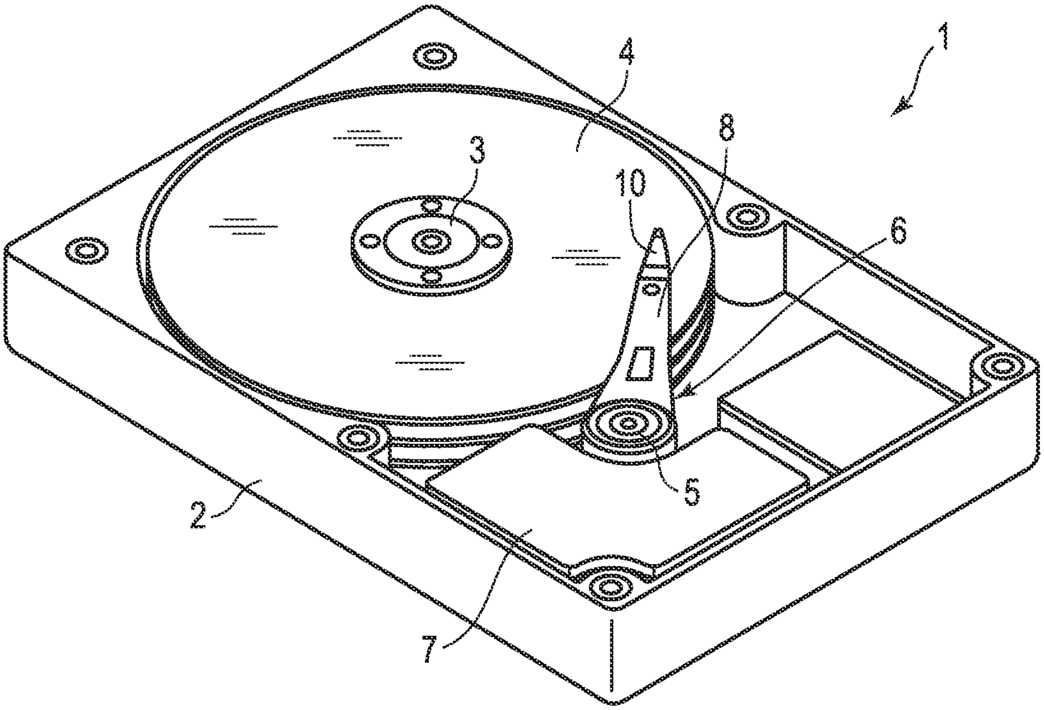
FIG. 1 is a schematic perspective view showing an example of a disk drive according to an embodiment.

FIG. 1 is a schematic perspective view showing an example of a disk drive (HDD) 1. The disk drive 1 comprises a case 2, disks 4 which rotate around a spindle 3, a carriage 6 which can turn on a pivot 5, and a positioning motor (voice coil motor) 7 for actuating the carriage 6. The case 2 is sealed by a lid not shown in the figure.

Figure 2:
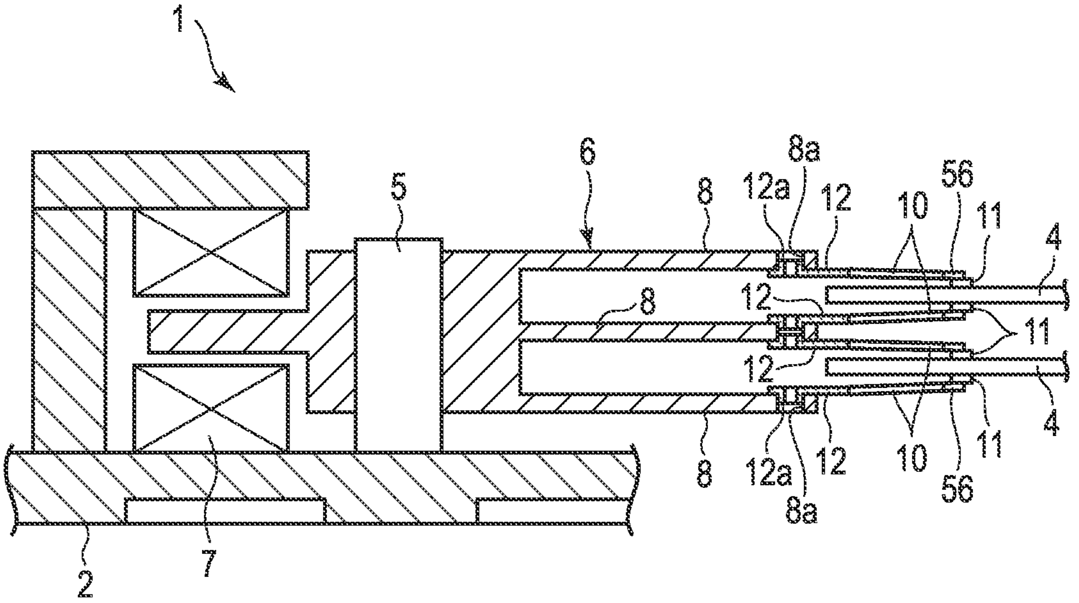
FIG. 2 is a schematic cross-sectional view of the disk drive shown in FIG. 1.

FIG. 2 is a schematic cross-sectional view showing part of the disk drive 1. As shown in FIG. 1 and FIG. 2, the carriage 6 is provided with arms (carriage arms) 8. On the distal end portions of the arms 8, suspensions 10 are mounted. The distal end portions of the suspensions 10 are provided with sliders 11, which constitute magnetic heads. When the disks 4 rotate at high speed, an influx of air into the space between the disks 4 and the sliders 11 forms an air bearing.

In the example of FIG. 2, the suspensions 10 comprise base plates 12. On the base plates 12, boss portion; **12*a* inserted into holes 8*a* formed in the arms 8** are formed.

When the carriage 6 is curried by the positioning motor 7, the suspensions 10 move in the radial direction of the disks 4, and the sliders 11 thereby move to desired tracks on the disks 4.

Figure 3:
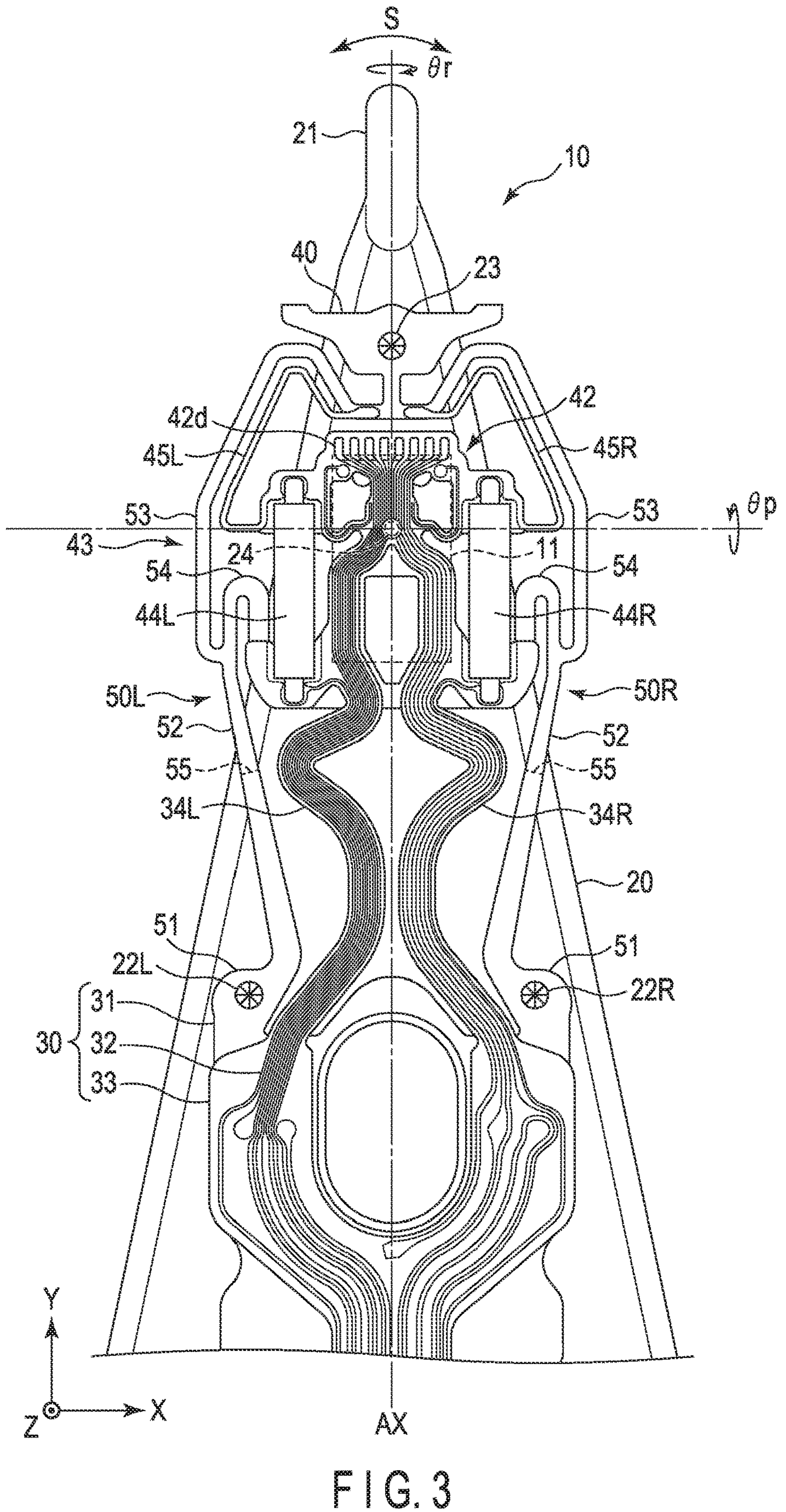
FIG. 3 is a schematic plan view of a suspension according to the embodiment.

FIG. 3 is a schematic plan view of the suspension 10 according to the present embodiment. The suspension 10 comprises a load beam 20 and a flexure 30. In the present embodiment, a width direction X, a length direction Y, and a thickness direction Z which are orthogonal to each other are defined as shown in the figure. In addition, a sway direction S is defined as indicated by an arc-shaped arrow in the vicinity of the distal end of the load beam 20. The load beam 20, the flexure 30, and the suspension 10 each have a shape long in the length direction Y.

The length direction Y is parallel to a central axis AX of the suspension 10. The load beam 20 and the flexure 30 have shapes that are substantially axisymmetric to each other with respect to the central axis AX.

The load beam 20 is formed of a metallic material into the shape of a flat plate. A tab 21 is provided at the distal end of the load beam 20. The load beam 20 has a planar shape tapering toward the tab 21. The load beam 20 is coupled to the base plate 12 shown in FIG. 2.

The flexure 30 is overlaid on the load beam 20. The flexure 30 comprises a metal base 31, a circuit layer 32, and an insulating layer 33. The metal base 31 is formed of a metallic material, for example, stainless steel, and most of the metal base 31 is opposed to the load beam 20.

The thickness of the meta base 31 is smaller than the thickness of the load beam 20. The thickness of the metal base 31 should preferably be 12 μm to 25 μm, and is, for example, 20 μm. The thickness of the load beam 20 is, for example, 30 μm.

The load beam 20 and the metal base 31 are fixed together by a pair of first fixing portions 22L and 22R and a second fixing portion 23. For example, laser spot welding can be used as a fixing method in the fixing portions 22L, 22R, and 23. The first fixing portions 22L and 22P are arranged in the width direction X. The distances from the first fixing portions 22L and 22R to the central axis AX are equal. The second fixing portion 23 is provided at a position closer to the tab 21 (distal end of the load beam 20) than the first fixing portions 22L and 22R. The second fixing portion 23 is located on the central axis AX.

The circuit layer 32 includes wires formed of metallic materials having excellent electrical conductivity, for example, copper. The insulating layer 33 includes layers such as a layer underlying each wire and a layer covering each wire. These layers can be formed of, for example, polyimide.

Most of the circuit layer 32 and the insulating layer 33 are formed on the metal base 31. In the example of FIG. 3, the circuit layer 32 and the insulating layer 33 include portions not supported by the metal base 31, such as a pair of unsupported circuit portions 34L and 34R.

Figure 4:
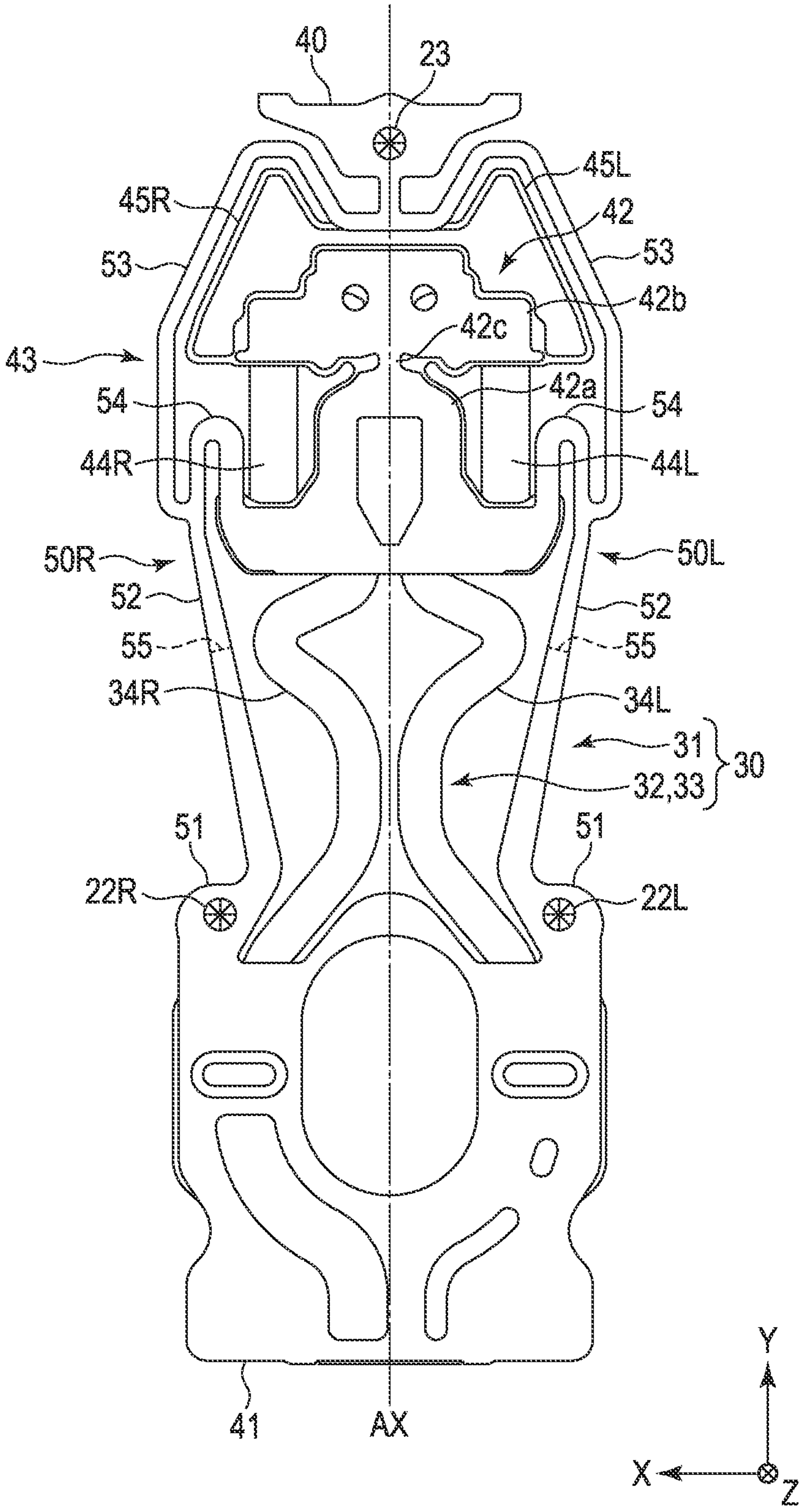
FIG. 4 is a schematic plan view of a flexure according to the embodiment.

FIG. 4 is a schematic plan view of the flexure 30 from the perspective of the metal base 31 side. As shown in FIG. 3 and FIG. 4, the metal base 31 comprises a distal end portion 40 and a proximal end portion 41 which are spaced apart in the length direction Y. As shown in FIG. 3, the distal end portion 40 is located in the vicinity of the tab 21 and fixed to the load beam 20 by the above-described second fixing portion 3.

The flexure 30 further comprises a for 42, a first outrigger 50L, and a second outrigger 50R. In most of the tongue 42, the insulating layer 33 is stacked on the metal base 31. In the examples of FIG. 3 and FIG. 4, the outriggers 50L and 50R are formed by the metal base 31. That is, the outriggers 50L and 50R do not include the circuit layer 32 and the insulating layer 33.

The tongue 42 is located between the distal end portion 40 and the proximal end portion 41 in the length direction Y. The outriggers 50L and 50R are placed outside both sides of the tongue 42 in the width direction X, respectively. That is, the tongue 42 is located between the first outrigger 50L and the second outrigger 50R in the width direction X.

In the example of FIG. 4, the tongue 42 comprises a first portion 42*a*, a second portion 42*b*, and a connection portion 42*c* connecting the first portion 42*a* and the second portion 42*b*. The second portion 42*b* is located between the first portion 42*a* and the distal end portion 40 in the length direction Y. The width of the connection portion 42*c* is smaller than those of the first portion 42*a* and the second portion 42*b*.

As shown in FIG. 3, the slider 11 is mounted on the tongue 42. The tongue 42 comprises terminals 42*d* used to electrically connect to the slider 11. The terminals 42*d* are provided in the second portion 42*b*.

The slider 11 comprises elements which can covert magnetic and electrical signals into each other, for example, MR elements. These elements access the disk 4, for example, write or read data to or from the disk 4. The slider 11, the load beam 20, and the flexure 30, etc., constitute a head gimbal assembly.

As shown in FIG. 3, a dimple 24 projecting toward the tongue 42 is formed in the vicinity of the distal end of the load beam 20. The dimple 24 is located on the central axis AX. The distal end of the dimple 21 is in contact with the tongue 42. The tongue 42 swings on the distal end of the dimple 24 and can make a desired gimbal movement. The tongue 42, the outriggers 50L and 50R, the dimple 24, etc., constitute a gimbal portion 43.

The first outrigger 50L comprises a proximal end portion 51, a proximal end arm 52, a distal end arm 53, and a connection portion 54. The proximal end portion 51 is fixed to the load beam 20 by the first fixing portion 22L. The proximal end arm 52 extends from the proximal end portion 51 toward the side of the tongue 42. In the examples of FIG. 3 and FIG. 4, the proximal end arm 52 is inclined with respect to the length direction Y to become further away from the central axis AX as it gets closer to the tongue 42. One end of the distal end arm 53 is connected to the proximal end arm 52, and the other end is connected to the distal end portion 40. The connection portion 54 is curved into a U-shape and connects the distal end of the proximal end arm 52 and the first portion 42*a* of the tongue 42.

The second outrigger 50R has a shape that is axisymmetric to the first outrigger 50L with respect to the central axis AX. That is, the second outrigger 50R comprises a proximal end portion 51, a proximal end arm 52, a distal end arm 53, and a connection portion 54. The proximal end portion 51 is fixed to the load beam 20 by the first fixing portion 22R. In the examples of FIG. 3 and FIG. 4, the respective distal end arms 53 of the outriggers 50L and 50R are united on the central axis AX between the distal end portion 10 and the tongue 12 and are connected to the distal end portion 40.

The first outrigger 50L can bend in the thickness direction Z between the first fixing portion 22L and the second fixing portion 23. Similarly, the second outrigger 50R can bend in the thickness direction Z between the first fixing portion 22R and the second fixing portion 23. The tongue 42 is elastically supported by the outriggers 50L and 50R and can swing on the dimple 24.

As shown in FIG. 3 and FIG. 4, a pair of microactuator elements 44L and 44R is mounted on the gimbal portion 43. The microactuator elements 44L and 44R are each made of a piezoelectric material, and are placed on both sides of the slider 11 in the width direction X. One end of the microactuator element 44L in the length direction Y is connected to the first portion 42*a* of the tongue 42, and the other end is connected to the second portion 42*b* of the tongue 42. Similarly, one end of the microactuator element 44R in the length direction Y is connected to the first portion 42*a*, and the other end is connected to the second portion 42*b*.

The microactuator elements 44L and 44R have the function of turning the tongue 42 in the sway direction S. In the examples of FIG. 3 and FIG. 4, limiter members 45L and 45R which suppress the excessive swing of the tongue 42 are provided. One end of the limiter member 45L is connected to the second portion 42*b* of the tongue 42, and the other end is connected to the distal end arm 53 of the first outrigger 50L. One end of the limiter member 45R is connected to the second portion 42*b* of the tongue 12, and the other end is connected to the distal end arm 53 of the second outrigger 50R. The limiter members 45L and 45R can be formed by, for example, the insulating layer 33.

The outriggers 50L and 50R are bent in the thickness direction Z at bent portions 55, respectively. In the examples of FIG. 3 and FIG. 4, the bent portions 55 are located in the proximal end arms 52 of the outriggers 50L and 50R, respectively.

Figure 5:
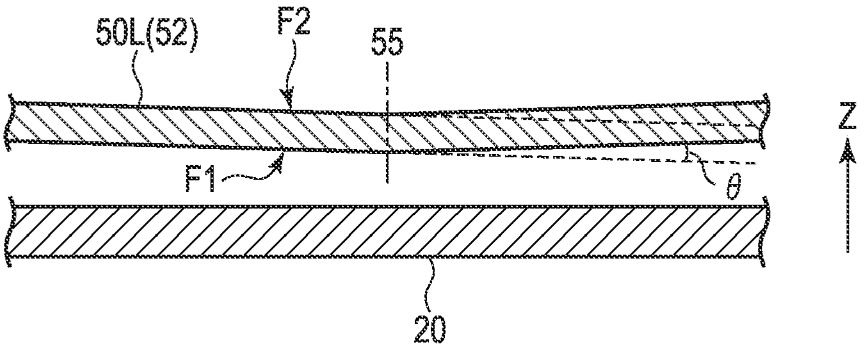
FIG. 5 is a schematic cross-sectional view of an outrigger including a bent portion and a load beam according to the embodiment.

FIG. 5 is a schematic cross-sectional view of the first outrigger 50L (proximal end arm 52) including the bent portion 55 and the load beam 20. The proximal end arm 52 comprises a first face F1 opposed to the load beam 20 and a second face F2 opposite to the first face F1. The proximal end arm 52 is bent at the bent portion 55 to make the first face F1 convex. It is also possible to say that the proximal end arm 52 is bent to be convex toward the load beam 20.

Various values can be adopted as a bending angle θ of the proximal end arm 52 at the bent portion 55, and for example, the bending angle θ is 0.5° to 3°. For example, the bending angle θ corresponds to the angle at which the first face F1 or the second face F2 changes at the bent portion 55. The proximal end arm 52 may be bent smoothly to have a curvature at the bent portion 55.

It is not necessarily required that the bruit portion 55 be provided at a position opposed to the load beam 20 as shown in FIG. 5. That is, the bent portion 55 may be provided at a portion projecting toward the side of the load beam 20 of the proximal end arm 52 shown in FIG. 3. In addition, the bent portion 55 may be provided at a position different from the proximal end arm 52, for example, at the distal end arm 53.

The position and shape of the bent portion 55 in the second outrigger 50R are the same as those of the bent portion 55 in the first outrigger 50L. That is, the bent portion 55 of the first outrigger 50L and the bent portion 55 of the second outrigger 50R are provided at the same positions in the length direction Y.

The bent portions 55 of the outriggers 50L and 50R have the function of suppressing the vibrations (sympathetic vibrations) of the flexure 30. In in the flexure 30, various modes of vibration can occur. Representative examples of the vibration modes include a first torsion mode, a second torsion mode, and a third torsion mode.

Figure 6:
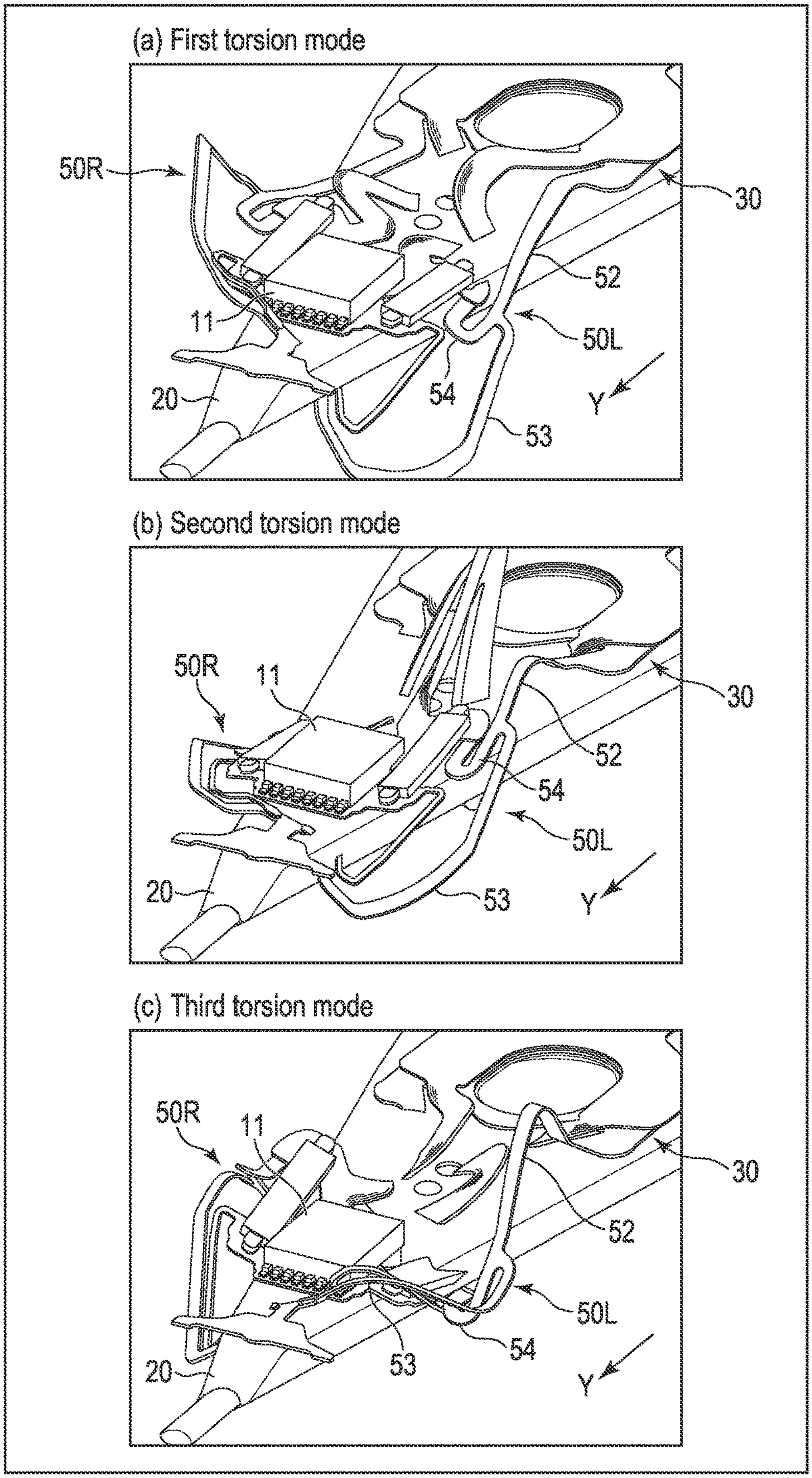
FIG. 6 is a schematic perspective view showing the flexure which vibrates in (a) a first torsion mode, (b) a second torsion mode, and (c) a third torsion mode, together with the load beam.
Figure 7:
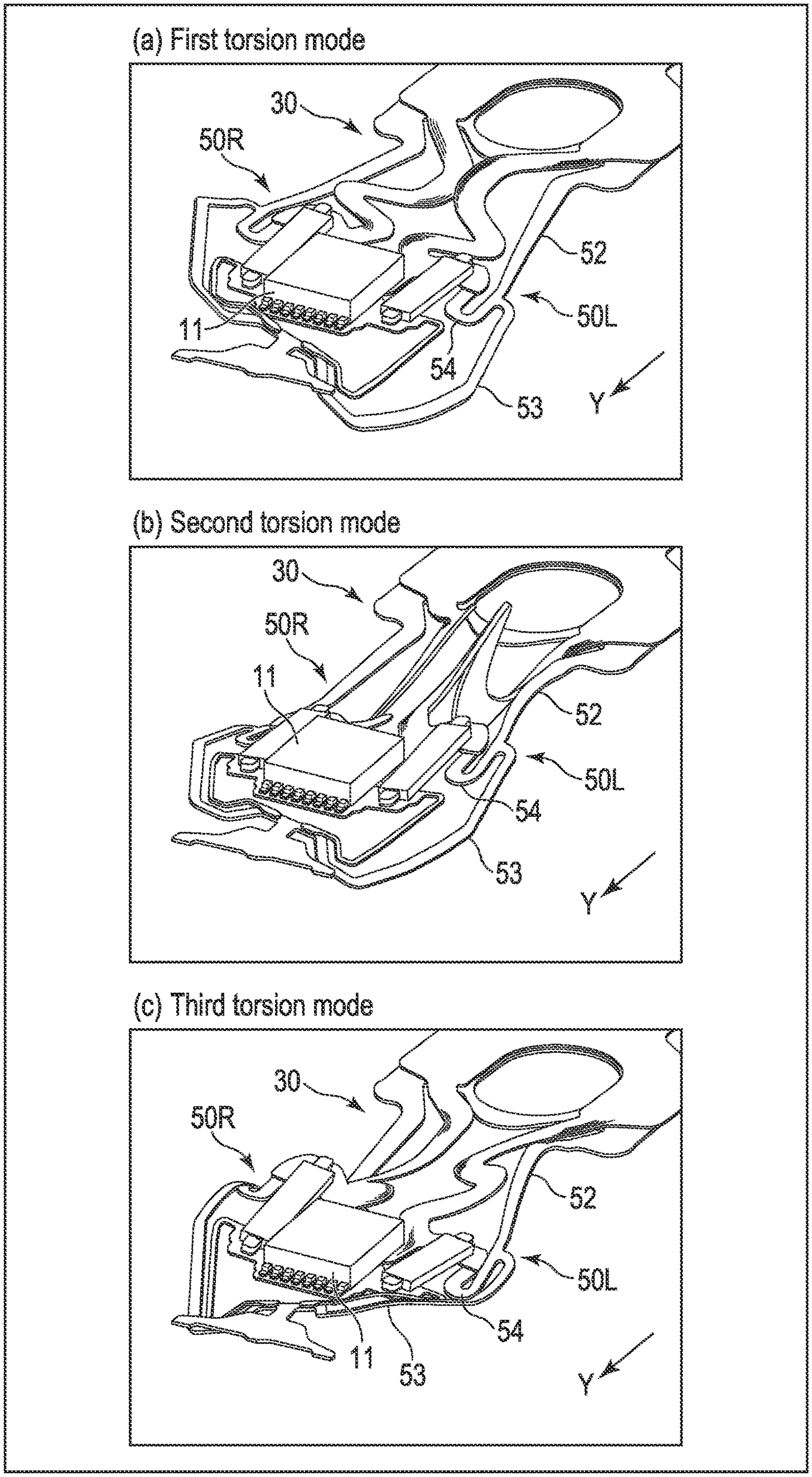
FIG. 7 is a schematic perspective view of the flexure which vibrates in (a) the first torsion mode, (b) the second torsion mode, and the third torsion mode.

FIG. 6 and FIG. 7 are schematic perspective views of the flexure 30, which vibrates in (a) the first torsion made, (b) the second torsion mode, and (c) the third torsion mode. FIG. 6 shows the load beam 20 together with the flexure 30. In contrast, FIG. 7 does not show the load beam 20.

In the first torsion mode shown in parts (a) of FIG. 6 and FIG. 7, the outriggers 50L and 50R are deformed to have one peak (mountain or valley). For example, in part (a) of FIG. 6, the first outrigger 50L is curved to make the middle part of the distal end arm 53 project downward.

In the second torsion mode shown in parts (b) FIG. 6 and FIG. 7, the outriggers 50L and 50R are deformed to have two peaks (mountains or valleys). For example, in part (b) of FIG. 6, the first outrigger 50L is curved to make the middle part of the proximal end arm 52 project upward and to make the middle part of the distal end arm 53 project downward.

In the third torsion mode shown in parts (c) of FIG. 6 and FIG. 7, the outriggers 50L and 50R are deformed to have three peaks (mountains or valleys). For example, in part (c) of FIG. 6, the first outrigger 50L is curved to make the middle part of the proximal end arm 52 project upward, to make the vicinity of the connection portion 54 project downward, and to make the middle part of the distal end arm 53 project upward.

The specific position where the bent portions 55 are formed in the outriggers 50L and 50R can be determined by considering the various vibration modes including the first to third torsion modes altogether.

Figure 8:
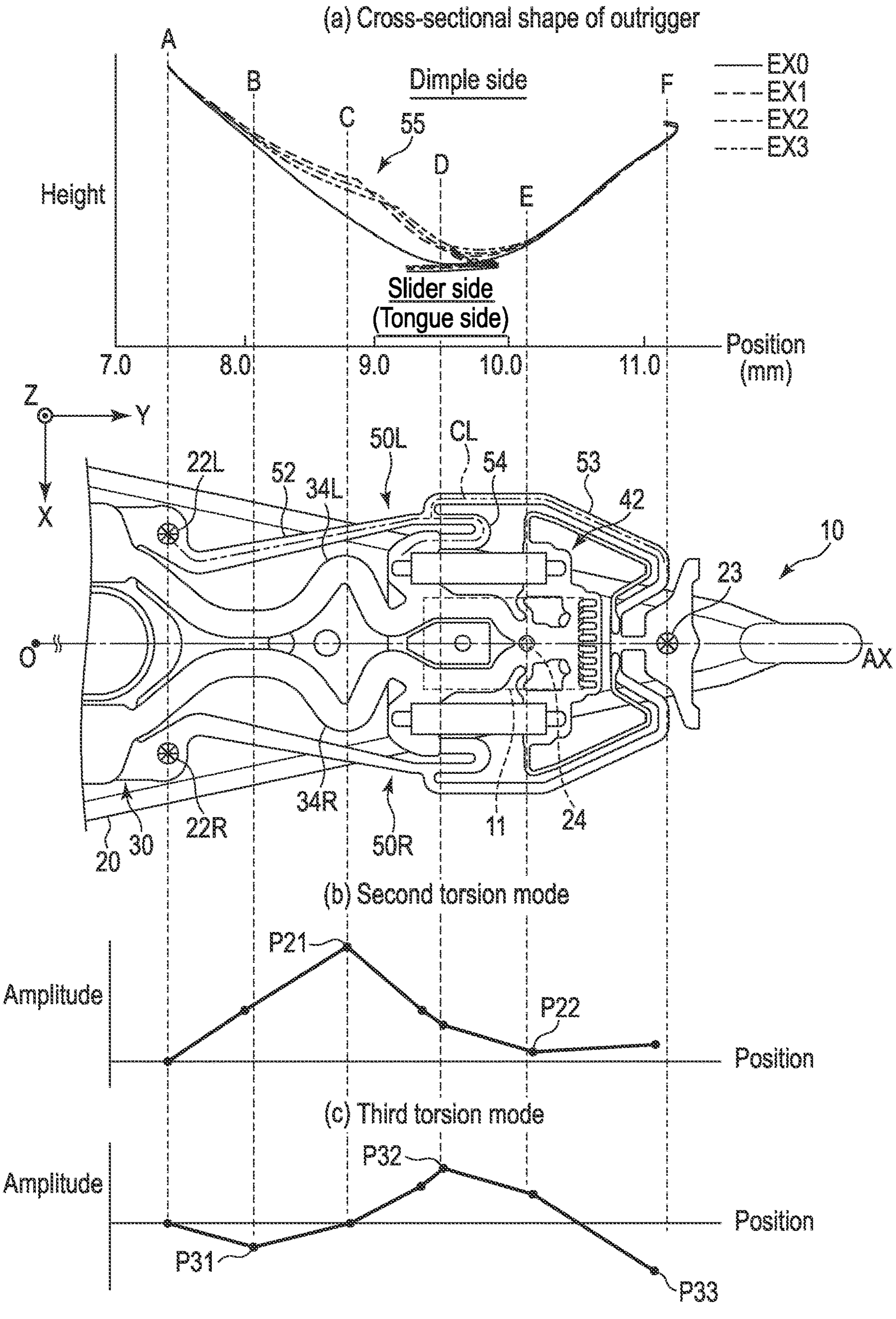
FIG. 8 is a diagram showing a specific example of the formation position of the bent portions in the suspension according to the embodiment.

FIG. 8 is a diagram showing a specific example of the formation position of the bent portions 55 in the suspension 10 according to the present embodiment. FIG. 8 shows (a) a graph showing the cross-sectional shape of the first outrigger 50L, (b) a graph showing the amount of displacement (amplitude) of the first outrigger 50L in the second torsion mode, and (c) a graph showing the amount of displacement (amplitude) of the first outrigger 50L in the third torsion mode, together with a plan view of the suspension 10.

In the graph of part (a) of FIG. 8, the horizontal axis represents the position [mm] in the length direction Y when the origin O is defined as a point of reference (zero), and the vertical axis represents the height measured when the direction from the slider 11 toward the dimple 24 (direction from the tongue 42 toward the dimple 24) is defined as an upward direction. The origin O corresponds to the center of a portion coupling the suspension 10 and the arm 8 shown in FIG. 1. For example, the origin O is the centers of the boss portions 12*a* provided on the base plates 12 described above.

The graph shown in part (a) of FIG. 8 shows curves of Comparative Example EX0 and Examples EX1, EX2, and EX3. The curves each represent the shape of the first outrigger 50L along line CL made on the first outrigger 50. To be specific, Comparative Example EX0 corresponds to the shape of the first outrigger 50L, which is not provided with the bent portion 55, and Examples EX1, EX2, and EX3 correspond to the shapes of the first outriggers 50L which are provided with the bent portions 55 at different positions, respectively.

In the graph of part of FIG. 8, to make the cross-sectional shapes of the first outriggers 50L understood more clearly, the amounts of change (scales) of the vertical axis are made larger than those of the horizontal axis. As can be seen from the curve of Comparative Example EX0, with the flexure mounted on the load beam 20, the first outrigger 50L curves to reach its peak in the vicinity of the tongue 42 even if the bent portion 55 is not provided.

In the graphs of parts (b) and (c) of FIG. 8, the horizontal axes represent the position in the length direction Y as in part (a) of FIG. 8, and the vertical axes represent the amplitude of the first outrigger 50L at the time of vibration. These graphs show schematic vibrations in each mode.

The amplitude of the second torsion mode exemplified in part (b) of FIG. 8 has a peak P21 in the proximal end arm 52 and has a peak P22 in the distal end arm 53. The amplitude of the third torsion mode exemplified in part (c) of FIG. 8 has a peak P31 in the proximal end arm 52, has a peak P32 in the vicinity of the connection portion 54, and has a peak P33 in the vicinity of the end portion of the distal end arm 53.

As indicated by broken lines in FIG. 8, positions A, B, C, D, F, and F arranged in order in the length direction Y are defined. The position A passes through the centers of: the first fixing portions 22L and 22R. The position B corresponds to the position of the peak P31 in the amplitude of the third torsion mode. The position C corresponds no the position of the peak P21 in the amplitude of the second torsion mode. In addition, the position C also overlaps the positions at which the unsupported circuit portions 34L and 34R are bent to project in the width direction X.

The position D corresponds to the position of the peak P32 in the amplitude of the third torsion mode. In addition, the position D also overlaps the vicinities of the border between the tongue 42 and the connection portion 54 and the border between the proximal end arm 52 and the distal end arm 53. The position E passes through the dimple 24. The position F passes through the second fixing portion 23.

The inventors studied the formation position of the bent portions 55 in consideration of various types of vibration mode in the suspension 10 according to the present embodiment. As a result, it has been proved that the vibrations of the flexure 30 can be suppressed excellently by providing the bent portions 55 of the outriggers 50L and 50R between the positions A and E. Moreover, if the bent portions 55 are provided between the positions B and D, the effect of suppressing vibrations can further increase.

In each of Examples EX1, EX2, and EX3 shown in part (a) of FIG. 8, the bent portion 55 is provided between the positions B and D, more specifically, between the positions C and D. The bent portion 55 in Example EX2 is closer to the position C than the bent portion 55 in Example EX1. In addition, the bent portion 55 in Example EX3 is closer to the position D than the bent portion 55 in Example EX2.

An example of a procedure for determining the formation position of the bent portions 55 will be herein described.

Figure 9:
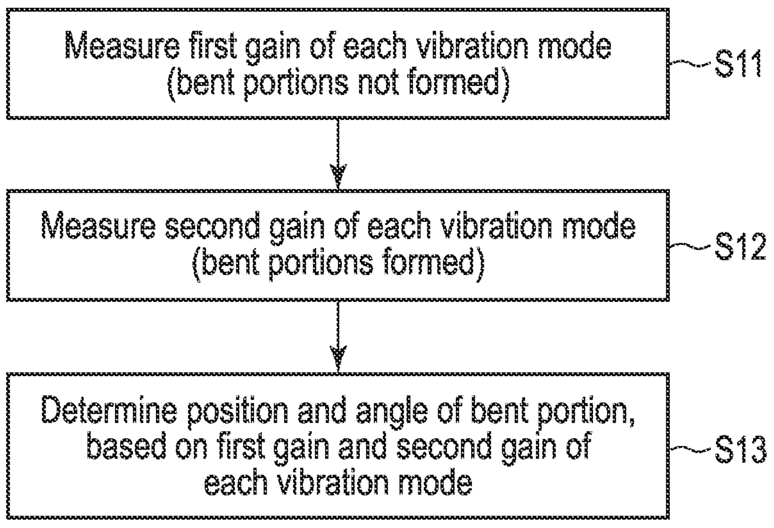
FIG. 9 is a flowchart showing an example of a procedure for determining the formation position of the bent portions in the suspension according to the embodiment.

FIG. 9 is a flowchart showing an example of the procedure for determining the formation position of the bent portions 55. First, the gain of the flexure 30 (outriggers 50L and 50R) in vibration modes of the suspension 10, in which the bent portions 55 are not formed, is measured (step S11). The gain measured in step S11 will be hereinafter referred to as a first gain.

Then, the gain of the flexure 30 (outriggers 50L and 50R) in vibration modes of the suspension 10, in which the bent portions 55 are formed, is measured (step S12). The gain measured in step S12 will be hereinafter referred to as a second gain.

The measurement in steps S11 and S12 can be carried out by, for example, simulation using a three-dimensional model of the suspension 10. The measurement in these steps may be carried out using a sample of the suspension 10 that is actually manufactured. The vibration modes whose gains are measured in steps S11 and S12 are, for example, the above-described first, second, and third torsion nodes.

The present embodiment assumes, for example, the case where the second gain of each of the first, second, and third torsion modes is measured by using a plurality of types of three-dimensional model or sample with the formation positions and bending angles of the bent portions 55 made different from each other.

Figure 10:
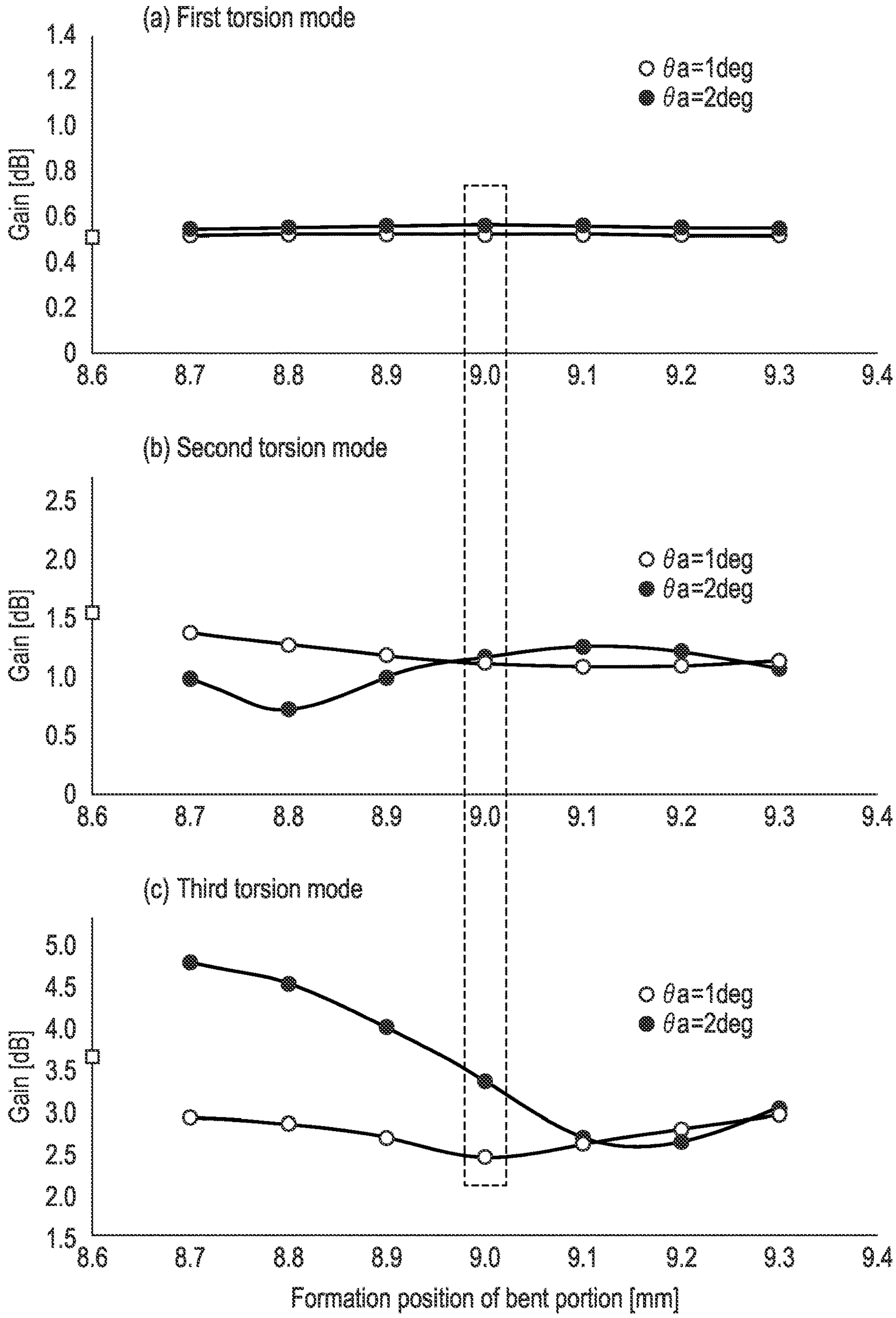
FIG. 10 is a diagram showing an example of results obtained by measuring a first gain and a second gain of the suspension according to the embodiment.

FIG. 10 is a diagram showing an example of results obtained by measuring the first and second gains of the suspension 10 according to the present embodiment. FIG. 10 shows the first and second gains measured in each of (a) the first torsion mode, (b) the second torsion mode, and (c) the third torsion mode.

In parts (a), (b), and (c) of FIG. 10, the horizontal axes represent the formation position [mm] in the length direction Y of the bent portions 55, and the origin O is defined as a point of reference (zero) as in part (a) of FIG. 8. In addition, the vertical axes represent the gains [dB]. The range of the formation position shown in parts (a), (b), and (c) of FIG. 10 corresponds to part of the space between the positions B and D in FIG. 8.

In parts (a), (b), and (c) of FIG. 10, square plots overlapping the vertical axes represent the first gain, white circular plots represent the second gain the case where a bending angle θa is 1°, and black circular plots represent the second gain in the case where the bending angle θa is 2°.

The bending angle θa is an angle in the case where the bent portions 55 are formed on the flexure 30 before the flexure 30 is mounted on the load beam 20. With the flexure 30 mounted on the load beam 20, the outriggers 50L and 50R curve as shown in part (a) of FIG. 8. Accordingly, the bending angle θa can be slightly different from the bending angle θ shown in FIG. 5.

As can be seen from part (a) of FIG. 10, in the first torsion mode, the second gain hardly change even if the formation position and the bending angle θa of the bent portions 55 are changed. This second gain is substantially equal to the first gain at any formation position.

As shown in part (b) of FIG. 10, in the second torsion mode, the second gain is smaller than the first gain on the whole in both cases where the bending angle θa is 1° and 2°. The second gain in the case where the bending angle θa is 1° is smallest in the vicinity of 9.1 mm. The second gain in the case where the bending angle θa is 2° is smallest in the vicinity of 8.8 mm.

As shown in part (c) of FIG. 10, in the third torsion mode, the second gain in the case where the bending angle θa is 1° is smaller than the first gain on the whole. In contrast, the second gain in the case where the bending angle θa is 2° is larger than the first gain. The second gain in the case where the bending angle θa is 1° is smallest in the vicinity of 9.0 mm. The second gain in the case where the bending angle θa is 2° is smallest in the vicinity of 9.2 mm.

After the first and second gains are measured in steps S11 and S12 shown in FIG. 9, the formation position and the bending angle θa of the bent portions 55 in the suspension 10 to be actually manufactured are determined on the basis of these gains (step S13). This determination can be carried out on various conditions. For example, the formation position and the bending angle θa with which the second gain is less than or equal to the first gain in at least one of the vibration modes whose gains have been measured, preferably in more than half the vibration modes, are selected.

If the first and second gains as shown in parts (a), (b), and (c) of FIG. 10 are obtained, the first torsion mode, in which the fluctuation of the second gain is small, is excluded from consideration, and the formation position and the bending angle θa can be determined mainly on the basis of the second gains in the second and third torsion modes.

For example, if it is necessary to suppress especially vibrations in the third torsion mode, the formation position may be determined to be 9.0 mm as enclosed in a broken-line frame. Moreover, at 9.0 mm, in both of the second and third torsion modes, the second gains in the case where the bending angle θa is 1° are smaller than the second gains in the case where the bending and θa is 2°. Thus, the bending angle θa may be determined to be 1°. On this condition, the second gain is less than the first gain also in the second torsion mode. Accordingly, in both of the second and third torsion modes, the vibrations of the flexure 30 can be reduced by the bent portions 55.

The explanation herein assumes the case where the formation position and the bending angle θa of the bent portions 55 determined in consideration of the first, second, and third torsion modes. However, the present embodiment is not limited to this example. In the determination of the formation position and the bending angle θa of the bent portions 55, other vibration modes of the flexure 3 may be taken into consideration in addition to or instead of the first, second, and third torsion modes. Furthermore, not only the vibration modes of the flexure 30 but also the coupling modes with the vibrations of the load beam 20 may be taken into consideration. The bending angle θa is not limited to 1° or 2°. For example, the bending angle θa can be determined in the range of 0.5° to 3°.

In the following description, a manufacturing device and a manufacturing method of the suspension 10 will be explained. In the present embodiment, when the suspension 10 is manufactured, a pitch angle θp and a roll angle θr shown in FIG. 3 are corrected to appropriate values.

The pitch angle θp corresponds to the amount of torsion with respect to a reference posture of the slider 11 around an axis parallel to the width direction X. The roll angle θr corresponds to the amount of torsion with respect to the reference posture of the slider 11 around an axis (central axis AX) parallel to the length direction Y.

It is also possible to say that the pitch angle θp is the amount of torsion with respect to a reference surface around an axis parallel to the width direction X of the surface on which the slider 11 is mounted of the tongue 42. In addition, it is also possible to say that the roll angle θr is the amount of torsion with respect to the reference surface around an axis to the length direction Y of the surface on which the slider 11 is mounted of the tongue 42.

Figure 11:
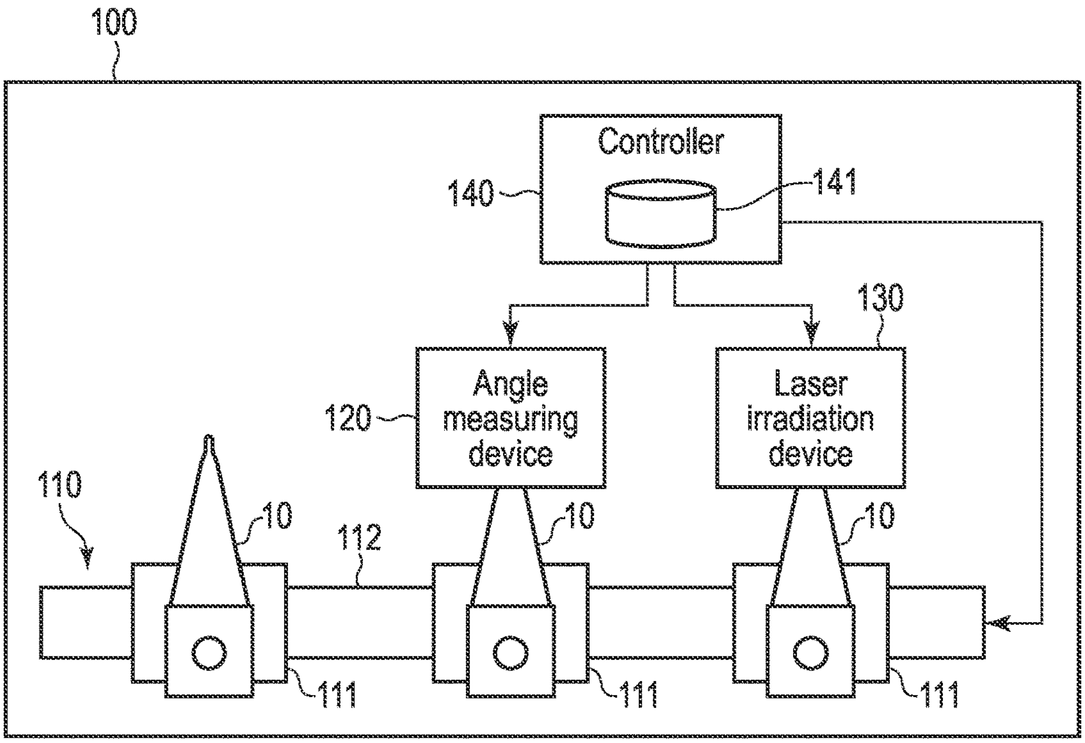
FIG. 11 is a diagram showing an example of a manufacturing device of the suspension according to the embodiment.

FIG. 11 is a diagram showing an example of a manufacturing device 100 of the suspensions 10. The manufacturing device 100 comprises a conveying device 110, an angle measuring device 120, a laser irradiation device 130, and a controller 140.

The conveying device 110 comprises stages 111 and a conveyance line 112 which moves each of the stages 111 to a position corresponding to the angle measuring device 120 or the laser irradiation device 130. The suspension 10 in the process of being manufactured is fixed to each of the stages 111.

The angle measuring device 120 measures the pitch angle θp and the roll angle θr of the suspension 10. The method of this measurement is not particularly limited, and for example, the pitch angle θp and the roll angle θr are detected on the basis of reflected light obtained when a laser beam for measurement is irradiated to the surface on which the slider 11 is mounted of the tongue 42. As another example, the pitch angle θp and the roll angle θr may be detected by capturing an image of the surface on which the slider 11 is mounted of the tongue 42.

The laser irradiation device 130 irradiates a first laser beam to the flexure 30 of the suspension 10 and forms the above-described bent portions 55. Moreover, the laser irradiation device 130 irradiates a second laser beam to the flexure 30 and corrects the pitch angle θp and the roll angle θr. In the present embodiment, both the first laser beam and the second laser beam are irradiated to the outriggers 501, and 50R. In addition, the present embodiment assumes the case where the second laser beam is weaker than the first Laser beam. However, the present embodiment not limited to this example.

For example, the first laser beam and the second laser beam are irradiated to the second faces F2 (see FIG. 5) of the outriggers 50L and 50R. When the first laser beam is irradiated to the second faces F2, the irradiated areas are heated. After that, when the irradiated areas are cooled, the outriggers 50L and 50R are deformed to make the second faces F2 concave (make the first faces F1 convex). The bending angles θ and θa can be adjusted by, for example, the irradiation conditions, such as the output and irradiation time of the first laser beam.

Also in the case where the second laser beam is irradiated to the second faces F2, the outriggers 50L and 50R are deformed similarly as in the case of the first laser beam. However, since the second laser beam is weaker than the first laser beam, the amount of deformation of the outriggers 50L and 50R due to the irradiation of the second laser beam is smaller than that of the outriggers 50L and 50R due to the irradiation of the first laser beam.

The fact that the second laser beam is weaker than the first laser beam means that, for example, the output of the second laser beam is smaller than that of the first laser beam, or the irradiation time of the second laser beam is shorter than that of the first laser beam. It is also possible to say that the amount of irradiation of the second laser beam is smaller than that of the first laser beam.

In the following description, the positions on the outriggers 50L and 50R to which the first laser beam is irradiated, that the positions at which the bent portions 55 are formed, will be referred to as a first position, and the positions on the outriggers 50L and 50R to which the second laser beam is irradiated will be referred to a second position.

The controller 140 controls the conveying device 110, the angle measuring device 120, and the laser irradiation device 130. Various processes executed by the controller 140 in the present embodiment are implemented by, for example, a processor executing a computer program.

The controller 140 stores correction data 141. The correction data 141 defines the relationship between the combinations of the pitch angle θp and the roll angle θr which deviate from target values, and the second position (irradiation line) to which the second laser beam is irradiated to make the pitch angle θp and the roll angle θr approximate to the target values. A plurality of second positions may be determined for each combination of the pitch angle θp and the roll angle θr. For example, the correction data 141 is created on the basis of an experiment or simulation using samples of the suspension 10. The correction data 141 may be, for example, the same as the correction recipe-table disclosed in JP 2007-066427 A.

Figure 12:
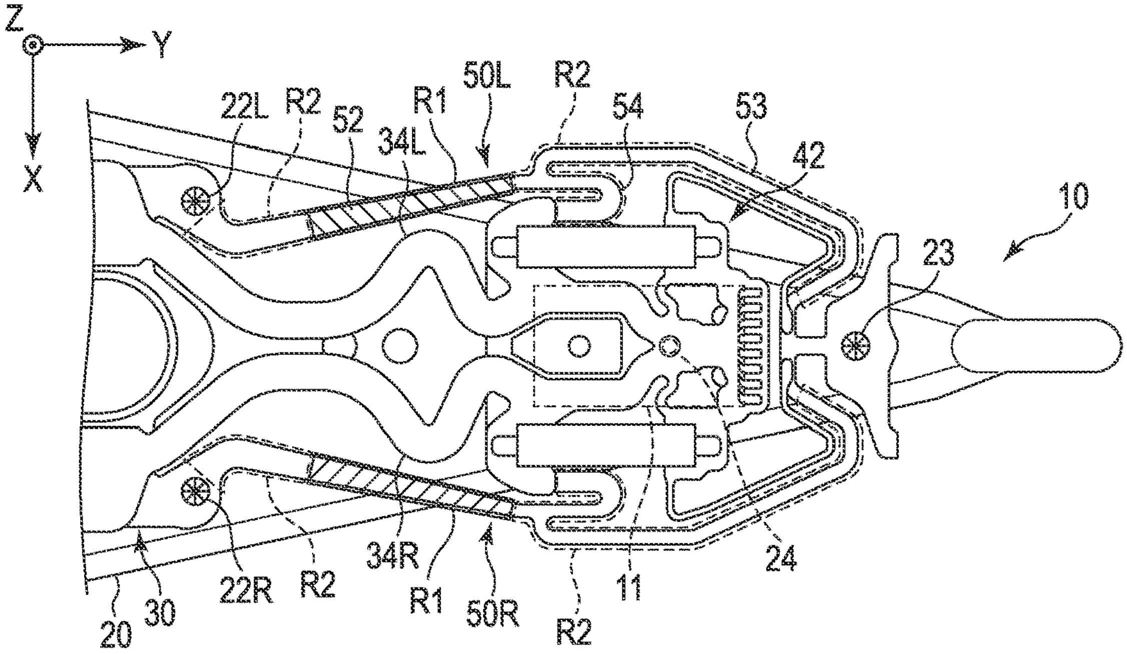
FIG. 12 is a diagram showing an example of the relationship between a first position and a second position in the suspension according to the embodiment.

FIG. 12 is a diagram showing an example of the relationship between the first position and the second position. In the present embodiment, the first position and the second position are both located on the outriggers 50L and 50R. The first position is selected from a first region R1 of the outriggers 50L and 50R. The second position is selected from a second region R2 of the outriggers 50L and 50R.

For example, the first region R1 is set between the dimple 24 and the first fixing portions 22L and 22R in the length direction Y. Preferably, the first region R1 is set between the positions A and E or the positions B and D shown in FIG. 8. In the example of FIG. 12, the first region R1 is set on each of the proximal end arms 52 of the outriggers 50L and 50R.

The second region 52 is, for example, set on a portion different from the first region R1 of the outriggers 50L and 50R. In the example of FIG. 12, the second region R2 is set on a portion not overlapping the first region R1 of each of the proximal end arms 52 of the outriggers 50L and 50R, each of the connection portions 54 of the outriggers 50L and 50R, and each of the distal end arms 53 of the outriggers 50L and 50R.

It is not necessarily required that the first region R1 and the second region R2 be set on different portions. That is, the first region R1 and the second region R2 may partly overlap.

Prior to the manufacture of the suspension 10, steps S11, S12, and S13 shown in FIG. 9 are carried out to determine the first position at which the bent portions 55 are formed and the bending angle θa. At least one of steps S11, S12, and S13 may be carried out by the manufacturing device 100. Moreover, a process for determining the predicted amounts of change of the pitch angle θp and the roll angle θr before and after the bent portions 55 are formed is executed.

Figure 13:
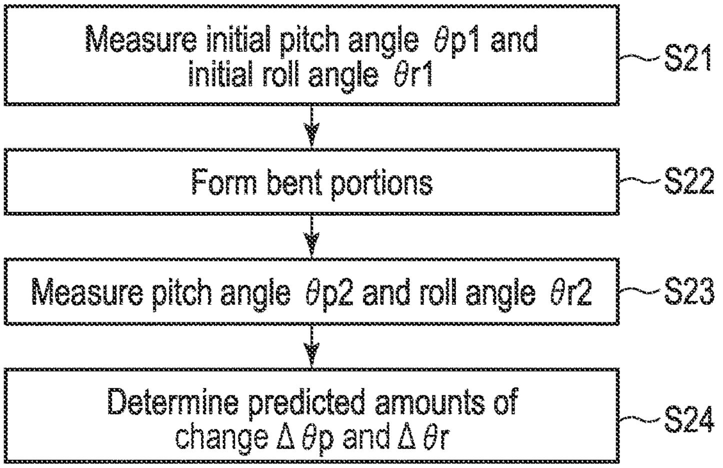
FIG. 13 is a to wart showing an example of a process for determining the predicted amounts of change of a pitch angle and a roll angle of the suspension according to the embodiment.

FIG. 13 is a flowchart showing an example of the process for determining the predicted amounts of change of the pitch angle θp and the roll angle θr. The steps described herein are carried out by the manufacturing device 100, for example, using an actually manufactured sample of the suspension 10. However, the steps may be carried out by a device different from the manufacturing device 100. In addition, the steps may be carried out by a simulation using a three dimensional model of the suspension 10.

In the flowchart of FIG. 13, first, the pitch angle θp and the roll angle θr of the suspension 10 before the bent portions 55 are formed are measured (step S21). To be specific, the conveying device 110 conveys the suspension 10 before the bent portions 55 are formed to the measurement position of the angle measuring device 120, and the angle measuring device 120 measures the pitch angle θp and the roll angle θr of the suspension 10. The pitch angle θp and the roll angle θr measured in step S21 will be hereinafter referred to as an initial pitch angle θp1 and an initial roll angle θr1, respectively.

After step S21, the bent portions 55 are formed on the outriggers 50L and 50R (step S22). In this step, the conveying device 110 first conveys the suspension 10 toward the laser irradiation device 130. Moreover, the laser irradiation device 130 irradiates the first laser beam to the first position determined in step S13 of FIG. 9. The bent portions 55 are thereby formed at the first position. The irradiation conditions, such as the output and irradiation time of the first laser beam, are adjusted so that the bending angle θa determined in step S13 can be obtained.

After the bent portions 55 are formed, the pitch angle θp and the roll angle θr of the suspension 10 are measured again (step S23). To be specific, the conveying device 110 conveys the suspension 10 to the measurement position of the angle measuring device 120, and the angle measuring device 120 measures the pitch angle θp and the roll angle θr of the suspension 10. The pitch angle θp and the roll angle θr measured in step S23 will be hereinafter referred to as a pitch angle θp2 and a roll angle θr2, respectively.

Then, the controller 140 determines the predicted amounts of change Δθp and Δθr of the pitch angle θp and the roll angle θr before and after the bent portions 55 are formed (step S24). For example, the predicted amount of change Δθp corresponds to the difference between the initial pitch angle θp1 and the pitch angle θp2. In addition, the predicted amount of change Δθr corresponds to the difference between the initial roll angle θr1 and the roll angle θr2.

Preferably, the predicted amounts of change nip and Δθr should be determined on the basis of results obtained by carrying out steps S21, S22, and S23, using samples of the suspension 10. For example, the predicted amount of change Δθp can be the average value of the amounts of change of the pitch angle θp before and after the bent portions 55 are formed measured in the samples of the suspension 10. Similarly, the predicted amount of change Δθr can be the average value of the amounts of change of the roll angle θr before and after the bent portions 55 are formed measured in the samples of the suspension 10.

Figure 14:
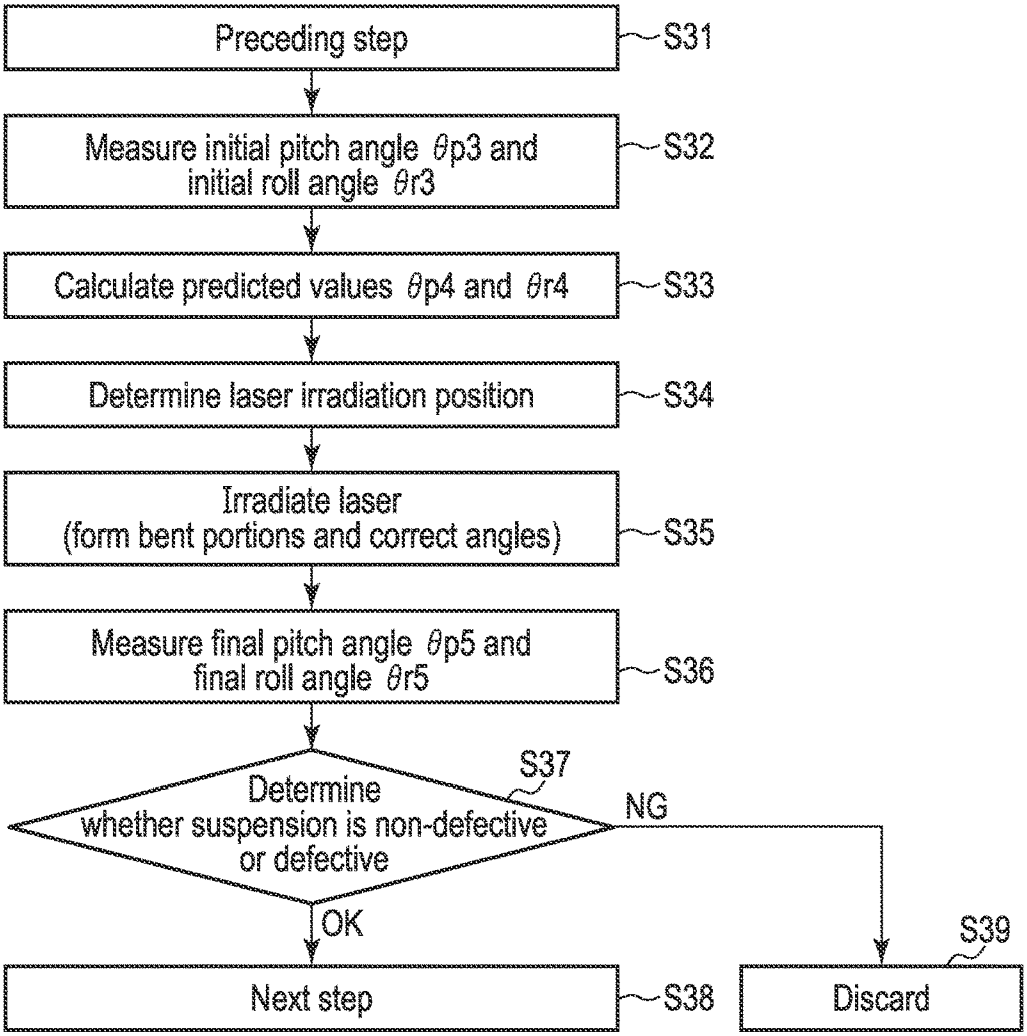
FIG. 14 is a flowchart showing an example of a manufacturing method of the suspension according to the embodiment.

FIG. 14 is a flowchart showing an example of the manufacturing method of the suspension 10. First, the preceding step including the preparation of the load beam 20 and the flexure 30 and the assembly of the load beam 20 and the flexure 30 is carried out (step S31). At this point in time, the bent portions 55 are not formed in the suspension 10.

After step S31, the pitch angle θp and the roll angle θr or the suspension 10, which has been subjected to preceding step S31, are measured (step 332). To be specific, the conveying device 110 conveys the suspension 10 before the bent portions 55 are formed to the measurement position of the angle measuring device 120, and the angle measuring device 120 measures the pitch angle θp and the roll angle θr of the suspension 10. The pitch angle θp and the roll angle θr measured in step S32 will be hereinafter referred to as an initial pitch angle θp3 and an initial roll angle θr3, respectively.

Next, the controller 140 calculates predicted values θp4 and θr4 of the pitch angle θp and the roll angle θr in the case where the bent portions 55 are formed in the suspension 10 (step S33). For example, the predicted value θp4 is a value obtained by adding the predicted amount of change Δθp to the initial pitch angle θp3 (θp4=θp3+Δθp). In addition, the predicted value θr4 is a value obtained by adding the predicted amount of change Δθr to the initial roll angle θr3 (θr4=θr3+Δθr).

Moreover, the controller 140 determines the second position to which the second laser beam is irradiated (step S34). To be specific, the controller 140 determines the second position which can make the predicted values θp4 and θr4 approximate to the target values of the pitch angle θp and the roll angle θr, respectively, using the correction data 141.

After step S34, the formation of the bent portions 55 and the correction of she pitch angle θp and the roll angle θr are carried out (step S35). In this step, the conveying device 110 first conveys the suspension 10 toward the laser irradiation device 130. Moreover, the laser irradiation device 130 irradiates the first laser beam to the first position determined in step S13 of FIG. 9 and irradiates the second laser beam to the second position determined in step S34. The bent portions 55 are thereby formed at the first position. In addition, the pitch angle θp and the roll angle θr of the suspension 10, in which the bent portions 55 are formed, are corrected to approximate to the target values.

After step S35, the pitch angle θp and the roll angle θr of the suspension 10 are measured again (step S36). To be specific, the conveying device 11) conveys the suspension 10 to the measurement position of the angle measuring device 120, and the angle measuring device 120 measures the pitch angle θp and the roll angle θr of the suspension 10. The pitch angle θp and the roll angle θr measured in step S36 will be hereinafter referred to as a final pitch angle θp5 and a final roll angle θr5, respectively.

The controller 140 determines whether the suspension 10 is non-detective or defective on the basis of the final pitch angle θp5 and the final roll angle θr5 (step S37). For example, if the difference between the target value of the pitch angle θp and the final pitch angle θp5 is less than or equal to a predetermined first permissible value and the difference between the target value of the roll angle θr and the final roll angle θr5 is less than or equal to a predetermined second permissible value, the controller 140 determines that the suspension 10 is non-defective (OK in step S37). At this time, the manufacture of the suspension 10 proceeds to the next step (step S38).

In contrast, the difference between the target value of the pitch angle θp and the final pitch angle θp5 exceeds the first permissible value or if the difference between the target value of the roll angle θr and the final roll angle θr5 exceeds the second permissible value, the controller 140 determines that the suspension 10 is defective (NG in step S37). At this time, the suspension 10 is discarded (step S39). In step S39, a sound may be output or an image may be displayed to notify an operator that the suspension 10 is defective.

In the above-described flowchart, if the difference between the target value of the pitch angle θp and the predicted value θp4 is less than or equal to the first permissible value and the difference between the target value of the roll angle θr and the predicted value θr4 is less than or equal to the second permissible value, the determination of the second position and the irradiation of the second laser beam may not be performed.

The steps shown in the flowchart of FIG. 14 are intended for the manufacture of one suspension 10. If a plurality of suspensions 10 of the same design are manufactured, the steps shown in the flowchart are carried out repeatedly. The formation positions and the bending angles of the bent portions 55 of the outriggers 50L and 50R of these suspensions 10 are identical. That is, the respective irradiation positions and irradiation conditions (output, irradiation time, amount of irradiation, etc.) of the first laser beam in step S35 carried out in the manufacture of the suspensions 10 are identical. On the other hand, the respective irradiation positions and irradiation conditions of the second laser beam for correcting the pitch angle θp and the roll angle θr are determined on the basis of step S32, S33, and S34, which are carried out for each of the suspensions 10. That is, the irradiation position and the irradiation conditions of the second laser beam can differ from suspension 10 to suspension 10.

According to the above-described present embodiment, the outriggers 50L and 50R are provided with the bent portions 55, and the suspension 10 with the vibrations in the vicinity of the gimbal portion 43 effectively suppressed thereby can be obtained. If the vibration characteristics are adjusted by the bent portions 55 of the outriggers 50L and 50R in this manner, the stiffness of the flexure 30, etc., hardly changes, as compared to, for example, that in the case where a damper member is attached to the flexure 30. That is, it is possible to improve the vibration characteristics while suppressing the influence on gimbal movement. In addition, because an additional component such as a damper member and its mounting step are unnecessary, an increase of the manufacturing cost of the suspension 10 also can be suppressed.

Moreover, in the present embodiment, the pitch angle θp and the roll angle θr are corrected in consideration of the fact that the bent portions 55 are provided. This enhances the quality of the suspension 10 and improves the yield rate.

Furthermore, in the present embodiment, the second position to which the second laser beam is irradiated to correct the pitch angle θp and the roll angle θr is determined before the bent portions 55 are formed. Accordingly, the first laser beam and the second laser beam can be irradiated in substantially the same step, and the manufacturing efficiency of the suspension 10 improves.

As described with reference to FIG. 12, if the first region R1 and the second region R2 are set on different portions of the outriggers 50L and 50R, the irradiation positions of the first laser beam and the second laser beam do not overlap. This makes it possible to suppress the variation of the pitch angle θp and the roll angle θr of the suspension 10 after the irradiation of each laser beam.

In addition to the above-described effects, various favorable effects can be obtained from the present embodiment.

Example

The inventors have tested the effect of correcting the pitch angle θp and the roll angle θr by the technique disclosed in the present embodiment in the suspension 10 having the shape shown in FIG. 3.

Figure 15:
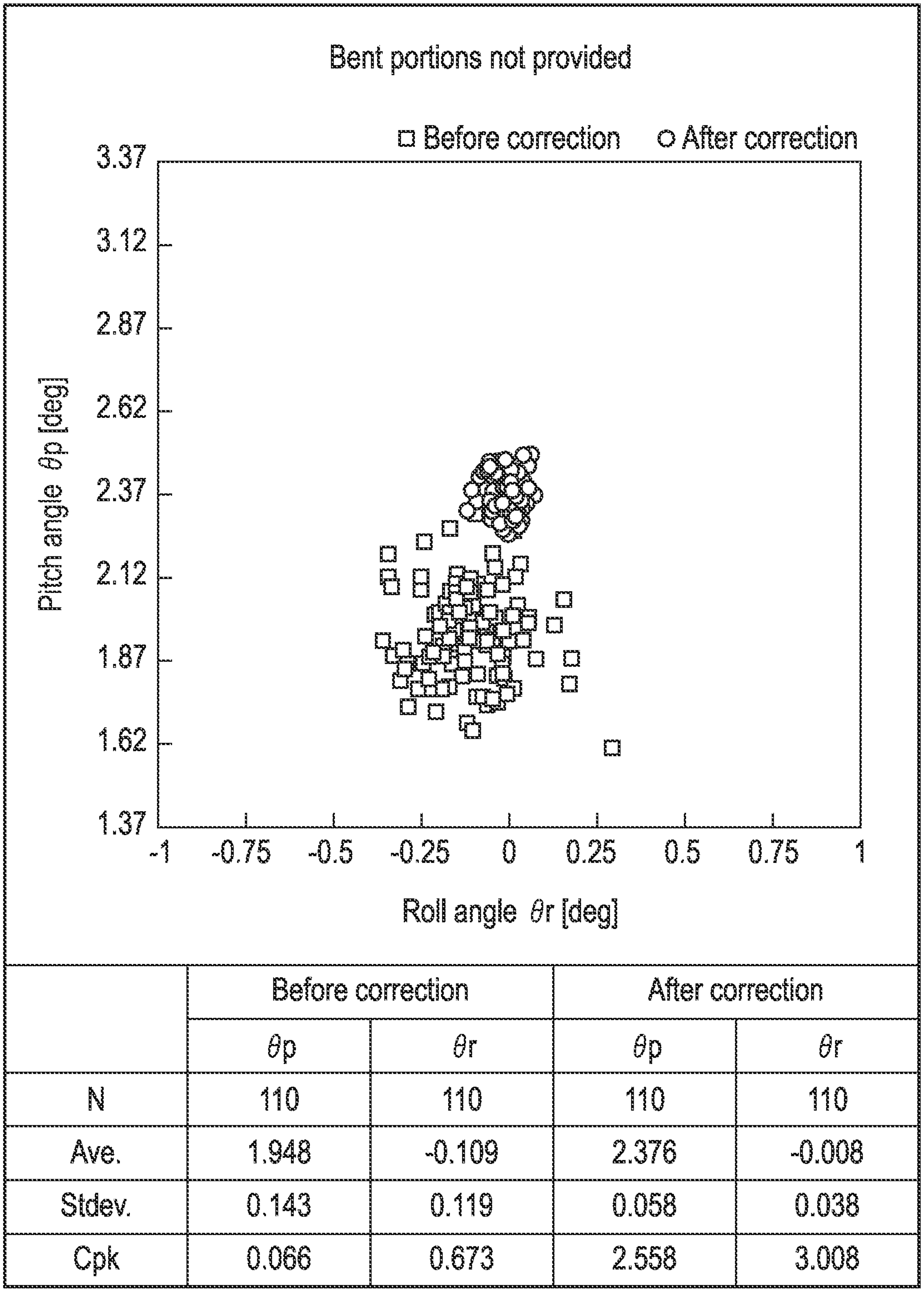
FIG. 15 is a graph and a table showing a Comparative Example in which the pitch angle and the roll angle of the suspension not provided with the bent portions are corrected.
Figure 16:
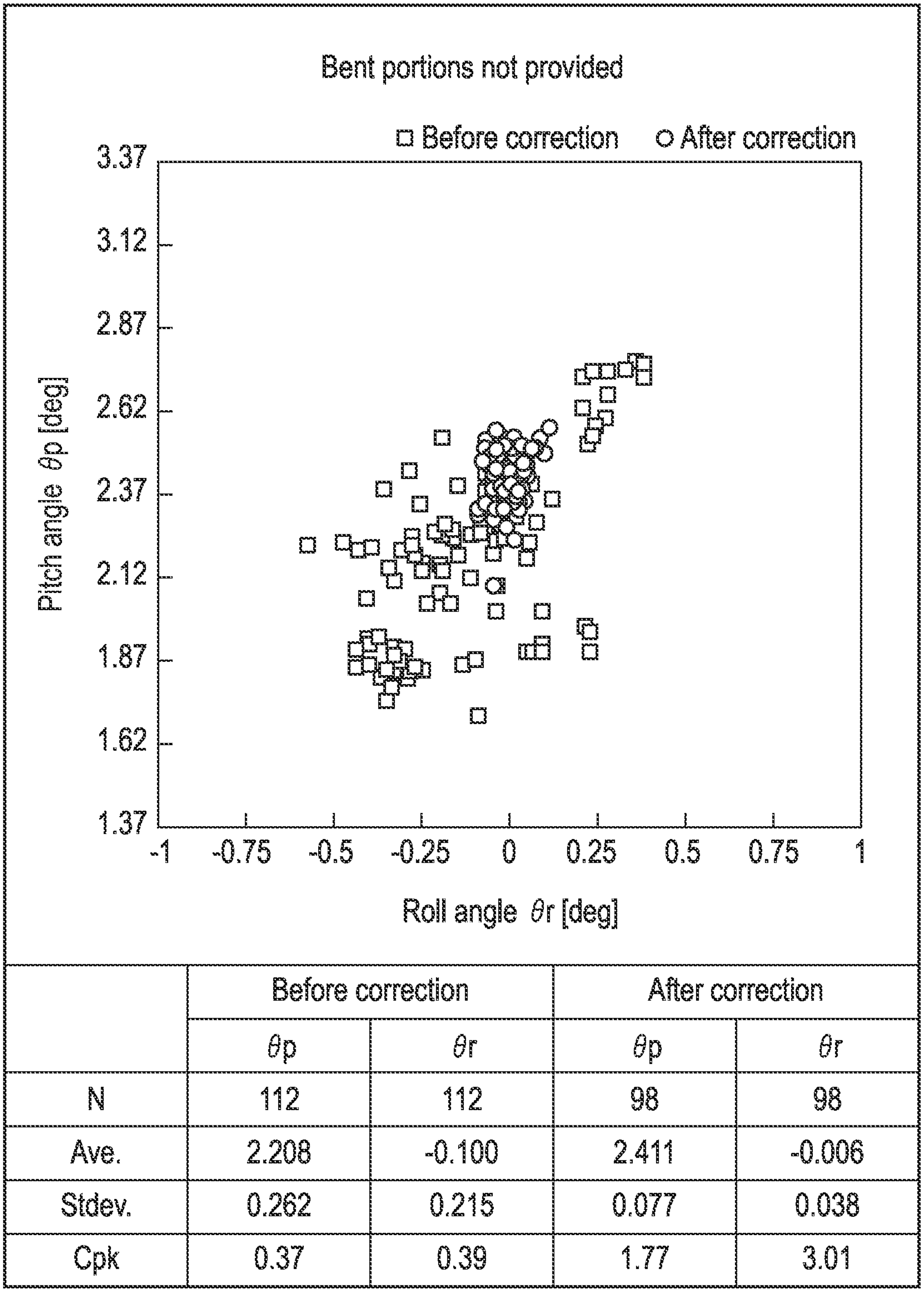
FIG. 16 is a graph and a table showing an Example in which the pitch angle and the roll angle of the suspension provided with the bent portions are corrected.

FIG. 15 is a graph and a table showing a Comparative Example in which the pitch angle θp and the roll angle θr of the suspension 10 not provided with the bent portions 55 are corrected. FIG. 16 is a graph and a table showing an Example in which the pitch angle θp and the roll angle θr of the suspension 10 provided with the bent portions 55 are corrected.

In the Comparative Example of FIG. 15, the second position is determined, using the pitch angle θp3 and the initial roll angle θr3 measured in step S32 as values input to the correction data 141. In the Example of FIG. 16, the formation of the bent portions 55 and the correction of the pitch angle θp and the roll angle θr are performed through the same procedure as that of the flowchart of FIG. 14.

In the graphs of FIG. 15 and FIG. 16, the vertical axes represent the pitch angles θp [deg] and the horizontal axes represent the roll angles θr [deg]. Square plots in these graphs represent the pitch angles θp and the roll angles θr of the suspension 10 measured before correction. In addition, circular plots in these graphs represent the pitch angles θp and the roll angles θr of the suspension 10 measured after correction.

The tables of FIG. 15 and FIG. 16 show the numbers of samples (N), the average values (Ave.) of the pitch angles θp and the roll angles θr of the samples, the standard deviations (Stdev.) of the pitch angles ep and the roll angles θr, and the process capability indices (Cpk) of the pitch antics θp and roll angles θr before and after correction of the pitch angles θp and the roll angles θr.

In both of the Comparative Example and the Example, the target value of the pitch angles θp is 2.37° and the target value of the roll angles θr is 0°.

In the Comparative Example of FIG. 15, before correction, the average values of the pitch angles θp and the roll angles θr are both smaller than the target values, and the standard deviations are large. In contrast, after correction, the average values of the pitch angles θp and the roll angles θr approximate closely to the target values, and the standard deviations are also small. The process capability indices also improve greatly after correction.

Also in the Example of FIG. 16, before correction, the average values of the pitch angles θp and the roll angles θr are both smaller than the target values, and the standard deviations are large. Some samples greatly deviate from the target values. In contrast, after correction, the average values of the pitch angles θb and the roll angles θr approximate closely to the target values, and the standard deviations are also small. As in the Comparative Example, the process capability indices also improve greatly after correction.

The above Example has confirmed that the variation in quality and the yield rate can be improved greatly by performing the formation of the bent portions 55 and the correction of the pitch angle θp and the roll angle θr by the technique disclosed in the present embodiment.

The above-described embodiment does not limit the scope of the present invention to the structure disclosed in the present embodiment. The present invention can be carried out by modifying the structure disclosed in the embodiment into various forms.

For example, the above-described embodiment at exemplifies the case where the outriggers 50L and 50R are bent at the bent portions 55 to make the first faces F1 convex as shown in FIG. 5. However, if the vibration characteristics are improved excellently, the outriggers 50L and 50R may be bent to make the second faces F2 convex.

In addition, the above-described embodiment assumes the case where a bent portion 55 is provided at only one position in each of the outriggers 50L and 50R. However, if the vibration characteristics are improved excellently, bent portions 55 may be provided at positions in each of the outriggers 50L and 50R.

It is not necessarily required that the second laser beam be irradiated to the second faces F2 of the outriggers 50L and 50R, and the second laser beam may be irradiated to the first faces F1. For example, in the suspension 10 shown in FIG. 3, most of the distal end arms 53 do not overlap the load beam 20. In such portions, a laser beam is easily irradiated to the first faces F1.

Furthermore, the above-described embodiment exemplifies the case where the formation position and the bending angle θa of the bent portions 55 are determined by the adjustment method shown in FIG. 9. As another example, the bending angle θa may be determined in advance to determine the formation position of the bent portions 55 of the bending angle θa by the adjustment method. For example, in step 312 of this case, the second gain in the case where the bent portions 55 are formed on the outriggers 50L and 50R in vibration modes is measured for each of the positions on the outriggers 50L and 50R at which the bent portions 55 are formed. Moreover, in step S13, a position with which the second gain smaller than the first gain is obtained in at least one of the vibration modes, of the above positions, is determined as the formation position of the bent portions 55 applied to the suspension 10 to be actually manufactured.

In addition, the formation position of the bent portions 55 may be determined in advance to determine the bending angle θa on the assumption that the bent portions 55 are formed at the determined formation position by the adjustment method. For example, in step S12 of this case, the second gain in the case where the bent portions 55 are formed at the formation position in vibration modes is measured for each of the bending angles θa of the bent portions 55. Furthermore, in step 313, an angle with which the second gain smaller than the first gain is obtained in at least one of the vibration modes, of the bending angles θa, is determined as the bending angle θa of the bent portions 55 applied to the suspension 10 to be actually manufactured.

What is claimed is:

1. A manufacturing method of a disk drive suspension, the disk drive suspension comprising a load beam which comprises a dimple and a flexure which includes a tongue opposed to the dimple and an outrigger connected to the tongue, and the manufacturing method comprising:

setting a first position within a first region on the outrigger at which a bent portion bent in a thickness direction is to be formed by irradiation of a first laser beam at the first position;

measuring, before forming the bent portion at the first position, initial values of a pitch angle and a roll angle of the tongue;

calculating, before forming the bent portion at the first position, predicted values of the pitch angle and the roll angle of the tongue that are predicted to result after the bent portion is formed at the first position, the predicted values being calculated based on (i) the initial values measured in the measuring and (ii) predicted amounts of change of the pitch angle and the roll angle before and after the bent portion is formed at the first position;

setting, before forming the bent portion at the first position, a second position on the outrigger, the second position being set within a second region different from the first region, and the second position being a position to which a second laser beam is to be irradiated to make the predicted values approximate to predetermined target values; and based on the first position and the second position having been set, irradiating the first laser beam to the first position to form the bent portion, and irradiating the second laser beam to the second position.

2. The manufacturing method of claim 1, further comprising determining the predicted amounts of change by measuring the pitch angle and the roll angle before and after the bent portion is formed in plural samples of the suspension.

3. The manufacturing method of claim 1, further comprising:

preparing an item of correction data which defines a relationship between the pitch angle and the roll angle deviating from the predetermined target values and the second position for making the pitch angle and the roll angle approximate to the predetermined target values; and setting the second position for making the predicted values approximate to the predetermined target values, using the item of correction data.

4. The manufacturing method of claim 1, further comprising:

measuring a first gain of the flexure in a case where the bent portion is not formed on the outrigger in a specific vibration mode;

measuring a second gain of the flexure in a case where the bent portion is formed on the outrigger in the specific vibration mode, the second gain being measured for each of positions on the outrigger at which the bent portion is formed; and setting a position with which the second gain smaller than the first gain is obtained, of the positions, as the first position.

5. The manufacturing method of claim 1, wherein the load beam and the flexure are fixed by a first fixing portion and a second fixing portion closer to a distal end of the load beam than the first fixing portion, and the first region is located between the dimple and the first fixing portion in a length direction of the load beam.

6. A manufacturing device of a disk drive suspension, the disk drive suspension comprising a load beam which comprises a dimple and a flexure which includes a tongue opposed to the dimple and an outrigger connected to the tongue, and the manufacturing device comprising:

a laser irradiation device configured to irradiate a first laser beam and a second laser beam to the outrigger; and a controller configured to control the laser irradiation device, wherein:

the controller is configured to execute processes comprising:

a first setting process of setting a first position within a first region on the outrigger at which a bent portion bent in a thickness direction is to be formed by irradiation of the first laser beam;

a process of measuring, before forming the bent portion at the first position, initial values of a pitch angle and a roll angle of the tongue;

a process of calculating, before forming the bent portion at the first position, predicted values of the pitch angle and the roll angle of the tongue that are predicted to result after the bent portion is formed at a first position, the predicted values being calculated based on (i) the initial values measured in the measuring and (ii) predicted amounts of change of the pitch angle and the roll angle before and after the bent portion is formed at the first position;

a second setting process of setting, before forming the bent portion at the first position, a second position on the outrigger, the second position being set within a second region different from the first region, and the second position being a position to which the second laser beam is irradiated to make the predicted values approximate to predetermined target values; and an irradiation process of, based on the first position and the second position having been set, controlling the laser irradiation device to irradiate the first laser beam to the first position to form the bent portion, and to irradiate the second laser beam to the second position.

7. The manufacturing device of claim 6, wherein the controller is configured to set the second position for making the predicted values approximate to the predetermined target values, using an item of correction data which defines a relationship between the pitch angle and the roll angle deviating from the predetermined target values and the second position for making the pitch angle and the roll angle approximate to the predetermined target values.

* * * * *